United States Patent [19]

Ihlenfeldt et al.

[11] E Re. 30,735

[45] Reissued Sep. 8, 1981

[54] AUTOMATIC THERMOCOUPLE REFERENCE JUNCTION COMPENSATOR

[75] Inventors: Eugene T. Ihlenfeldt, Enumclaw; David E. Marshall, Kent, both of Wash.

[73] Assignee: The Boeing Company, Seattle, Wash.

[21] Appl. No.: 157,771

[22] Filed: Jun. 9, 1980

Related U.S. Patent Documents

Reissue of:

[64] Patent No.: 4,157,663
Issued: Jun. 12, 1979
Appl. No.: 899,957
Filed: Apr. 25, 1978

[51] Int. Cl.[3] ..... G01K 7/12
[52] U.S. Cl. ..... 73/361
[58] Field of Search ..... 73/361

[56] References Cited

U.S. PATENT DOCUMENTS 3,921,453 11/1975 Platzer ..... 73/361
4,120,201 10/1978 Wargo ..... 73/361

*Primary Examiner*—S. Clement Swisher
*Attorney, Agent, or Firm*—Thomas H. Murray

[57] ABSTRACT

A system for automatic cold-junction referencing of thermocouples in temperature controllers wherein a differential amplifier is used to amplify the thermocouple signal prior to establishing the cold-junction compensation and measuring range. This permits the use of command signals from any floating or single-ended source, making the controller compatible with existing traditional command generators and with computer systems with digital-to-analog converters. The amplifier isolates the thermocouple from the remainder of the circuitry such that it can be grounded on the heated part.

4 Claims, 1 Drawing Figure

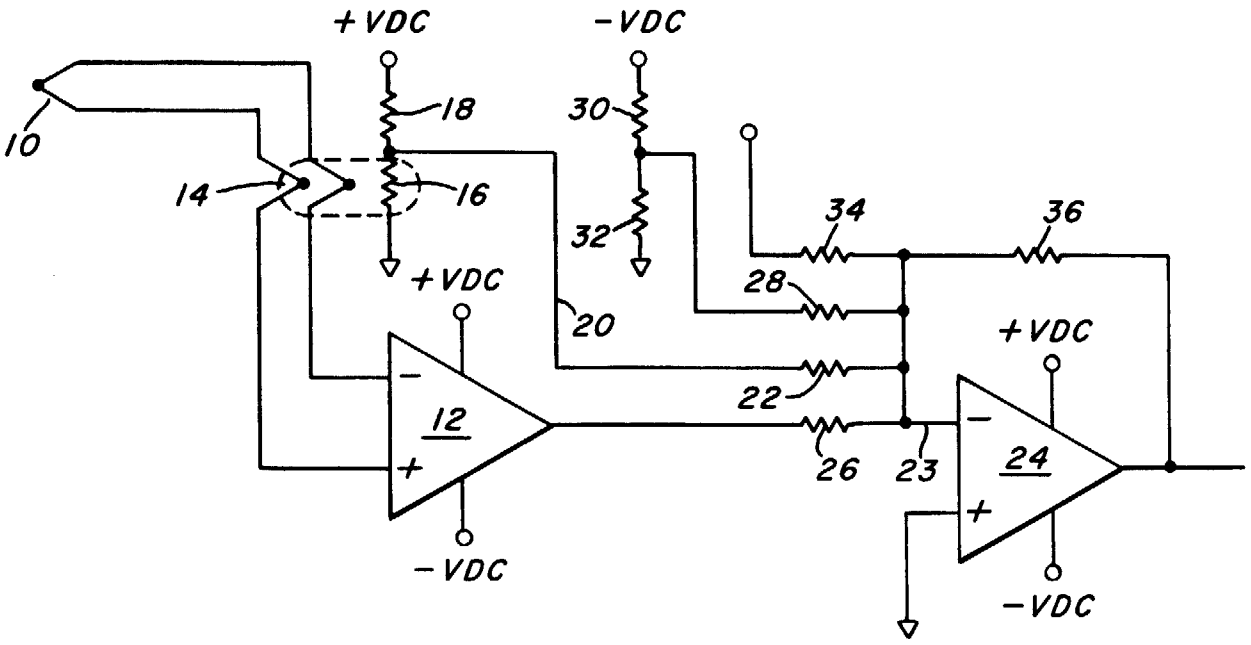
+VDC
-VDC
+VDC
-VDC
+VDC
-VDC
10
14
16
18
20
22
23
24
26
28
30
32
34
36
12
24

AUTOMATIC THERMOCOUPLE REFERENCE JUNCTION COMPENSATOR

Matter enclosed in heavy brackets [ ] appears in the original patent but forms no part of this reissue specification; matter printed in italics indicates the additions made by reissue.

BACKGROUND OF THE INVENTION

As is known, automatic cold-junction referencing of thermocouples is achieved electrically by creating an electrical signal which has the same voltage versus temperature characteristic as the thermocouple cold-junction signal has over a range of ambient temperatures. This signal is then added directly to the incoming thermocouple signal to compensate for changes in ambient temperature. The technique has been used for a number of years, is quite accurate, and widely accepted. It is used in commercially-available thermocouple-feedback temperature controllers. However, these controllers cannot be programmed with a voltage source such as computer-based systems with digital-to-analog converters, except under the very restrictive condition that the thermocouple be isolated from ground.

Two approaches to the problem of measuring the output of a grounded thermocouple are taken in modern temperature controllers. In one approach, the entire controller is floated above electrical ground, permitting the thermocouple to be grounded. This requires a high degree of isolation from ground and from the input alternating current power source. In the second approach, a differential amplifier is used to isolate the thermocouple from all other grounds. However, in this device, the cold-junction compensation and set point versus feedback summing is achieved prior to amplification. This approach requires an additional highly isolated power supply to provide a source of voltage to the set point and cold-junction compensating circuits. Neither of these approaches will accept a single-ended voltage command when a grounded thermocouple is used.

In the past, various techniques have been employed in an attempt to solve the problem of making a temperature controller which is compatible with a computer-based command generator. One method has been to isolate all thermocouples from ground. This, however, is not a very desirable approach since the best thermal contact is achieved by spot-welding or mechanically fastening the thermocouple to the heated part. In another attempt to solve the problem, voltage programming is avoided, which requires the use of an isolated device such as a manual- or motor-driven potentiometer.

SUMMARY OF THE INVENTION

In accordance with the present invention, the foregoing problems experienced with prior art automatic cold-junction referencing systems are obviated by employing a differential amplifier to amplify the thermocouple signal prior to establishing the cold-junction compensation and measuring range such that the thermocouple itself can be grounded on the heated part. At the same time, the system can be used with command signals from any floating or single-ended source.

Specifically, the system of the invention includes a measuring thermocouple adapted to be placed in contact with an object whose temperature is to be measured, together with thermocouple reference junction means connected in series-opposition with the measuring thermocouple. The measuring thermocouple and the reference junction means are connected in series across the input terminals of a first differential amplifier. The output of this amplifier, in turn, is connected to the input of a second amplifier along with a temperature compensation resistor whose resistivity varies as a function of ambient temperature and a temperature command signal from a computer or the like.

The above and other objects and features of the invention will become apparent from the following detailed description taken in connection with the accompanying single FIGURE drawing which forms a part of this specification.

With reference now to the drawing, the measuring thermocouple junction is indicated by the reference numeral 10 and normally will be in contact with an object whose temperature is to be measured. Thermal contact is preferably achieved by spot-welding the thermocouple to the item whose temperature is to be measured. Connected in series-opposition with thermocouple 10 across the input terminals of a first differential amplifier 12 is a thermocouple cold-junction 14. The junction 14 is positioned close to a temperature compensating resistor 16 in order that they remain at the same temperature (i.e., ambient temperature). With the arrangement shown, it will be appreciated that as the ambient temperature increases or decreases, so also will the voltages generated by the thermocouples 10 and 14 increase or decrease. Since the thermocouples are connected in series-opposition, the voltage input to the differential amplifier 12 will be essentially zero so long as the device whose temperature is being measured by junction 10 is at ambient temperature.

The temperature compensating resistor 16 is connected between a source of direct current voltage and ground through resistor 18, the junction of resistors 16 and 18 being connected through lead 20 and resistor 22 to one input terminal 23 of a second differential amplifier 24. It will be noted that the other or positive terminal of the differential amplifier 24 is connected to ground. Also connected to the input terminal 23 through resistor 26 is the output of the first differential amplifier 12. Input terminal 23 is also connected through resistor 28 to a source of bias voltage provided by a voltage divider consisting of resistors 30 and 32 connected between a source of negative direct current voltage and ground. Finally, a command signal from a computer or other device, representing the desired temperature signal, is applied to input terminal 23 through resistor 34. The output of amplifier 24 is connected back to the input terminal 23 through feedback resistor 36. The output of the amplifier 24 can then be used to control a heating device, for example, to maintain the temperature of the device whose temperature is being measured at a predetermined level.

As was mentioned above, when the measuring thermocouple 10 is at ambient temperature, the output of the first differential amplifier 12 will be zero. However, at the same time, a signal proportional to ambient temperature is applied to the input of amplifier 24 from the compensation resistor 16. Should the input command signal applied through resistor 34 be increased, an output will be produced from amplifier 24 which, in turn, will actuate a heating device to increase the temperature of the device being measured. Thereafter, when the temperature rises to the level dictated by the command signal, the signal from differential amplifier 12 in addition to the signals from resistors 16 and 32 will balance that applied through resistor 34, and the output of amplifier 24 will drop to zero.

The present invention thus provides a thermocouple measuring circuit wherein an amplifier is used to amplify a thermocouple signal prior to establishing the cold-junction compensation and measuring range. The thermocouple can be grounded on the heated part and, at the same time, command signals from any floating or single-ended source can be applied to the system. Another advantage of the invention is that by amplifying the thermocouple signal before compensation, the requirement for highly isolated power supplies is eliminated. Compensation resistor 16 need not be the extremely accurate low ohmic value type of device which is very expensive.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. Temperature measuring apparatus comprising a measuring thermocouple adapted to be placed in contact with an object whose temperature is to be measured, thermocouple reference junction means connected in series-opposition with said measuring thermocouple, [a] temperature compensation [resistor] *means* whose [resistivity] *output signal* varies as a function of ambient temperature, first and second differential amplifiers each having a pair of input terminals, ungrounded conductors connecting said measuring thermocouple and said reference junction means across the input terminals of said first differential amplifier, a source of bias voltage, and means [connecting said source of] *for applying said* bias voltage, the output *signal* of said first differential amplifier, said *output signal of said* compensation [resistor] *means* and a temperature command signal to one of the input terminals of said second differential amplifier, the other input terminal of said second differential amplifier[, said source of bias voltage and said compensation resistor] being connected to ground.

2. The measuring apparatus of claim 1 wherein said compensation [resistor] *means* is connected in series with a [second] resistor across a source of direct current voltage, the junction of said [resistors] *resistor and said compensation means* being connected to the input of said second differential amplifier.

3. The measuring apparatus of claim 1 wherein said thermocouple reference junction means and said temperature compensation [resistor] *means* are in close proximity to each other such that their temperatures are the same.

4. The measuring apparatus of claim 3 including impedance means connecting the output of said second differential amplifier to said one input terminal of the second differential amplifier.

* * * * *